United States Patent
Hill et al.

(10) Patent No.: US 7,227,742 B2
(45) Date of Patent: Jun. 5, 2007

(54) SYSTEM FOR ORGANIZING ONE OR MORE PERSONAL COMPUTER ACCESSORY DEVICES

(75) Inventors: David W. Hill, Cary, NC (US); Susan S. Moffatt, Chapel Hill, NC (US); Robert E. Springer, Stevensville, MI (US); John D. Swansey, Durham, NC (US); Julie E. Tierney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 288 days.

(21) Appl. No.: 10/950,303

(22) Filed: Sep. 23, 2004

(65) Prior Publication Data

US 2005/0122672 A1   Jun. 9, 2005

Related U.S. Application Data

(63) Continuation-in-part of application No. 09/335,201, filed on Jun. 17, 1999, now abandoned.

(51) Int. Cl.
G06F 1/16 (2006.01)
H05K 7/00 (2006.01)

(52) U.S. Cl. ...................................... 361/683; 361/680
(58) Field of Classification Search ............... 361/683, 361/680, 686
See application file for complete search history.

(56) References Cited

U.S. PATENT DOCUMENTS

| | | | |
|---|---|---|---|
| 4,749,364 A | 6/1988 | Arney et al. | |
| 5,144,567 A | 9/1992 | Oelsch et al. | |
| 5,264,992 A | 11/1993 | Hogdahl et al. | |
| 5,268,675 A | 12/1993 | Garthwaite et al. | |
| D346,141 S * | 4/1994 | McConnell | D12/133 |
| 5,472,351 A * | 12/1995 | Greco et al. | 439/353 |
| 5,504,500 A | 4/1996 | Garthwaite et al. | |
| 5,548,477 A | 8/1996 | Kumar et al. | |
| 5,555,487 A | 9/1996 | Katoh et al. | |
| 5,583,744 A | 12/1996 | Oguchi et al. | |
| 5,625,534 A | 4/1997 | Okaya et al. | |
| 5,742,756 A | 4/1998 | Dillaway et al. | |
| 5,752,857 A | 5/1998 | Knights | |
| 5,828,034 A | 10/1998 | Chang | |
| 6,021,944 A | 2/2000 | Arakaki | |
| 6,056,193 A | 5/2000 | McAuliffe et al. | |
| 6,264,506 B1 * | 7/2001 | Yasufuku et al. | 439/638 |
| 6,312,175 B1 | 11/2001 | Lum | |
| 6,386,920 B1 * | 5/2002 | Sun | 439/630 |
| 6,923,379 B2 * | 8/2005 | Washino et al. | 235/492 |
| 2002/0054024 A1 | 5/2002 | Andres et al. | |
| 2003/0106974 A1 * | 6/2003 | Guertin | 248/309.1 |

FOREIGN PATENT DOCUMENTS

JP   04167114 A  *  6/1992

* cited by examiner

*Primary Examiner*—Anatoly Vortman
(74) *Attorney, Agent, or Firm*—Sawyer Law Group LLP

(57) ABSTRACT

A system for organizing one or more accessory devices for a personal computer includes a first body structure that houses a first accessory device and an attachment unit detachably attached to the first body structure for attaching and detaching the first body structure mechanically to an outside surface of a personal computer (PC) component. According to the present invention, the attachment unit can be removed from the first body structure and attached to a second body structure that houses a second accessory device so that the second body structure can be attached to the PC component.

18 Claims, 6 Drawing Sheets

SYSTEM FOR ORGANIZING ONE OR MORE PERSONAL COMPUTER ACCESSORY DEVICES

REFERENCE TO RELATED APPLICATION

The present application is a continuation-in-part of application Ser. No. 09/335,201, now abandoned entitled PC KEYBOARD WITH DETACHABLE SMARTCARD SECURITY DEVICE, filed Jun. 17, 1999, and assigned to the assignee of the present application.

FIELD OF THE INVENTION

The present invention relates to personal computers, and more particularly to a system for organizing one or more personal computer accessory devices.

BACKGROUND OF THE INVENTION

As personal computers offer more and more services to users, the number of accessory devices or accessories related to the computer and its functions is increasing. These accessories only add to the clutter around the area of the computer. This becomes problematic when space is limited. For example, typically, a user's desk at home is large enough only to accommodate the computer's display and keyboard. If the desk is larger, then perhaps, a printer and fax machine will be squeezed onto the desk.

When the clutter builds, accessories can easily be misplaced or damaged. For accessories that have sensitive components, e.g., exposed contacts, their operation can be impaired if the components become contaminated by dirt or oils found on the user's fingers or on the desk.

Accordingly, what is needed is a system for organizing one or more accessories around a personal computer such that the user can easily locate the accessories and the accessories can be protected from harm. The present invention addresses such a need.

BRIEF SUMMARY OF THE INVENTION

The present invention provides a system for organizing one or more accessory devices for a personal computer. The system includes a first body structure that houses a first accessory device and an attachment unit detachably attached to the first body structure for attaching and detaching the first body structure mechanically to an outside surface of a personal computer (PC) component. According to the present invention, the attachment unit can be removed from the first body structure and attached to a second body structure that houses a second accessory device so that the second body structure can be attached to the PC component.

According to the system disclosed herein, the present invention allows one or more accessories to be temporarily attached to an outside surface of a PC component, such as a keyboard, directly or via an accessory bar. The accessory bar is easily attached and detached to the keyboard and is located in an area of the keyboard that does not interfere with the operation of the computer or the keyboard. By attaching the accessories to the accessory bar, the accessories are safely and securely stored, and readily available to the user. In addition, desk clutter is reduced.

DETAILED DESCRIPTION OF THE INVENTION

The present invention relates to personal computers, and more particularly to a system for organizing one or more accessory devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
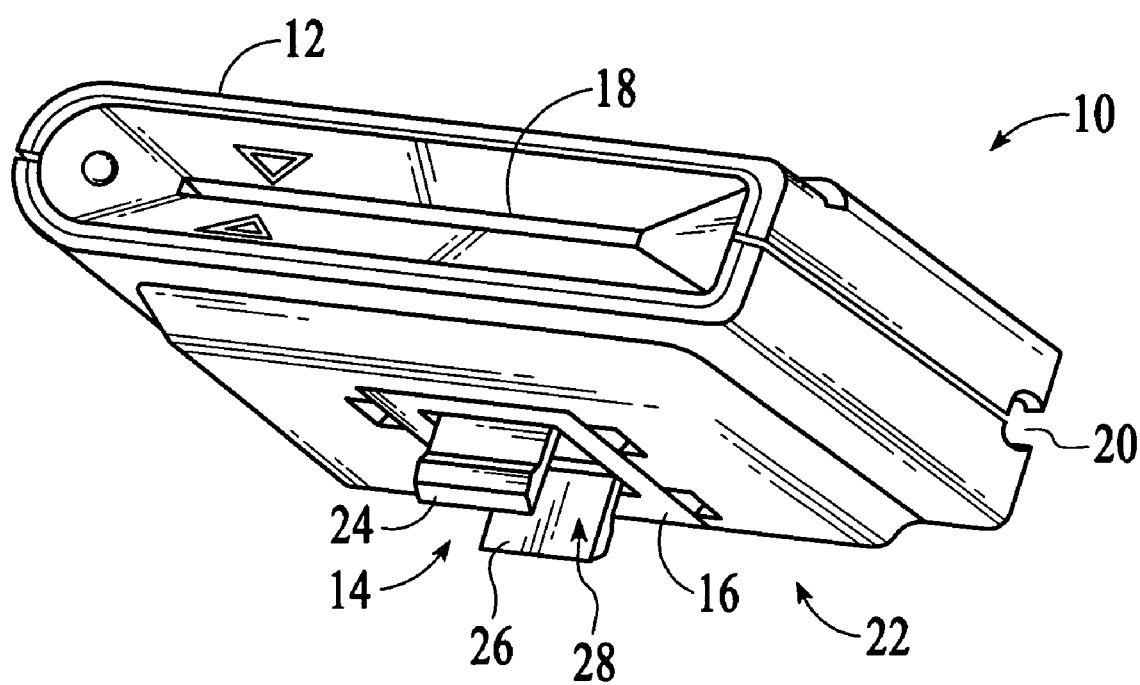
FIG. 1 is a perspective view of a PC accessory device according to a first preferred embodiment of the present invention.

FIG. 1 illustrates a PC accessory device with a clip assembly according to a preferred embodiment of the present invention. The PC accessory device illustrated is a Smartcard utility kit 10, which includes an outer case or body structure 12 that houses a Smartcard reader (not shown) and an attachment unit 14 that couples the body structure 12 to a computer component (not shown). Those skilled in the art readily appreciate that the accessory device can be a device other than a Smartcard reader. For example, the accessory device can be one or more audio speakers, a camera, or microphones, etc.

In a preferred embodiment, the attachment unit 14 is coupled to the body structure 12 by sliding the attachment unit 14 (in the direction indicated by the arrow 22) into a channel (not shown) formed in the body structure 12. Accordingly, the attachment unit 14 can be uncoupled from the body structure 12 without damaging either the attachment unit 14 or the body structure 12, and the attachment unit 14 can be used for a different accessory device that is similarly structured.

In a first preferred embodiment, the attachment unit 14 is a clip assembly 16 that includes two pronged legs 24, 26. When the attachment unit 14 is secured in the body structure 12, the legs 24, 26 extend outward and perpendicular to a surface of the body structure 12. The legs 24, 26 are utilized to couple the body structure 12 directly to the PC keyboard or other component via slots in the keyboard or component.

Figure 2:
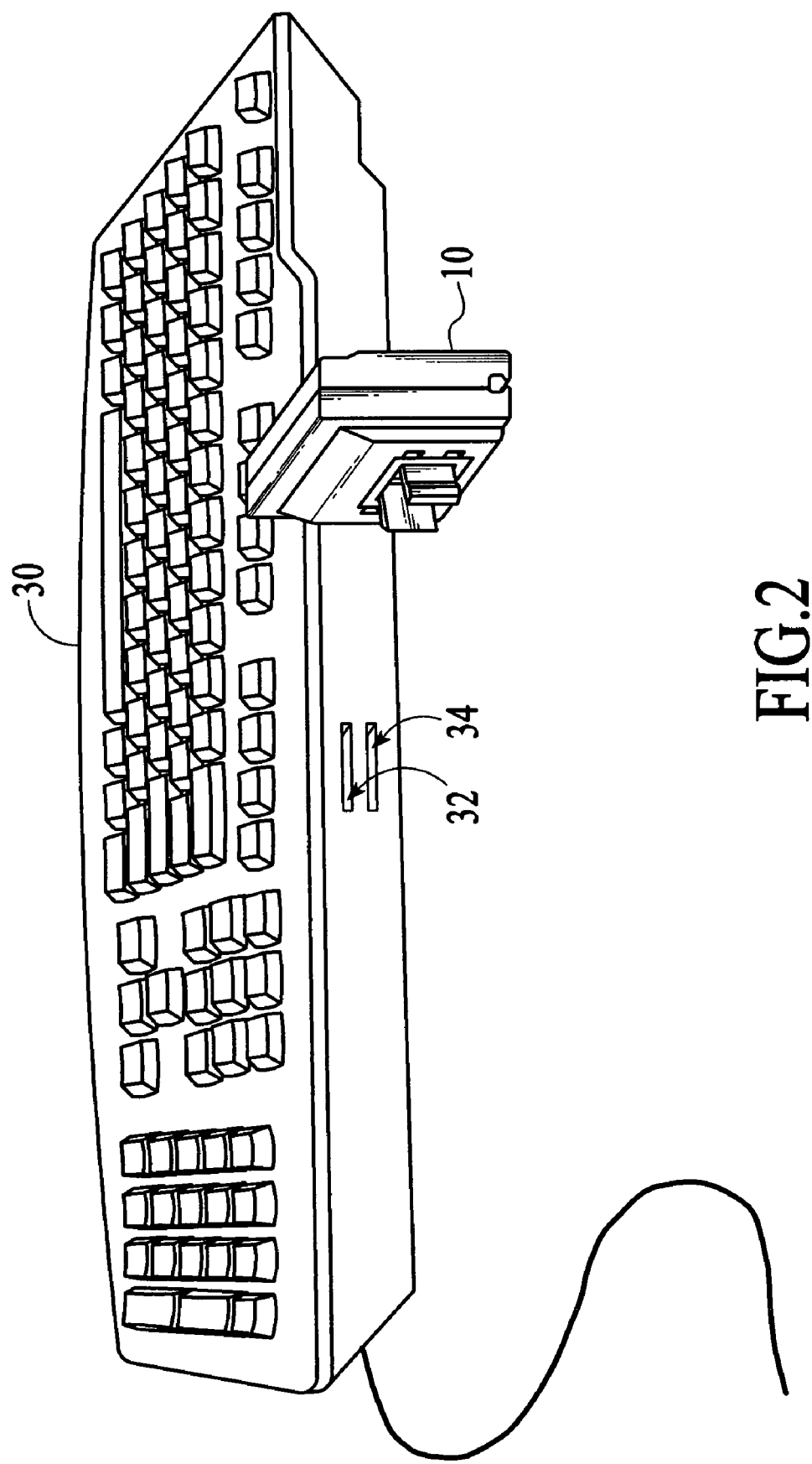
FIG. 2 illustrates a perspective view of a stand alone PC keyboard according to a first preferred embodiment of the present invention.

FIG. 2 illustrates a perspective view of a stand alone PC keyboard 30 according to a preferred embodiment of the present invention. As is shown, the keyboard 30 includes a plurality of slots 32, 34 that are formed to receive the clip assembly's legs 24, 26. The slots 32, 34 are molded into the keyboard 30 and preferably provide only a mechanical or physical coupling between the clip device 16 and the keyboard 30. That is, the slots 32, 34 are not intended to provide an electronic coupling between the accessory device 10 and the keyboard 30.

The clip device 16 is preferably formed from a pliable but stiff material, e.g., plastic or metal, such that when the legs 24, 26 are inserted into the corresponding slots 32, 34, the legs 24, 26 snap the clipping assembly 16 securely into place. When the user wishes to remove the clipping assembly 16, the user compresses the legs 24, 26 to release the assembly 16 from the slots 32, 34. In the case of FIG. 2, although the slots 32, 34 are located on the back surface of the keyboard 30, additional slots (not shown) can be located on side surfaces.

Figure 3:
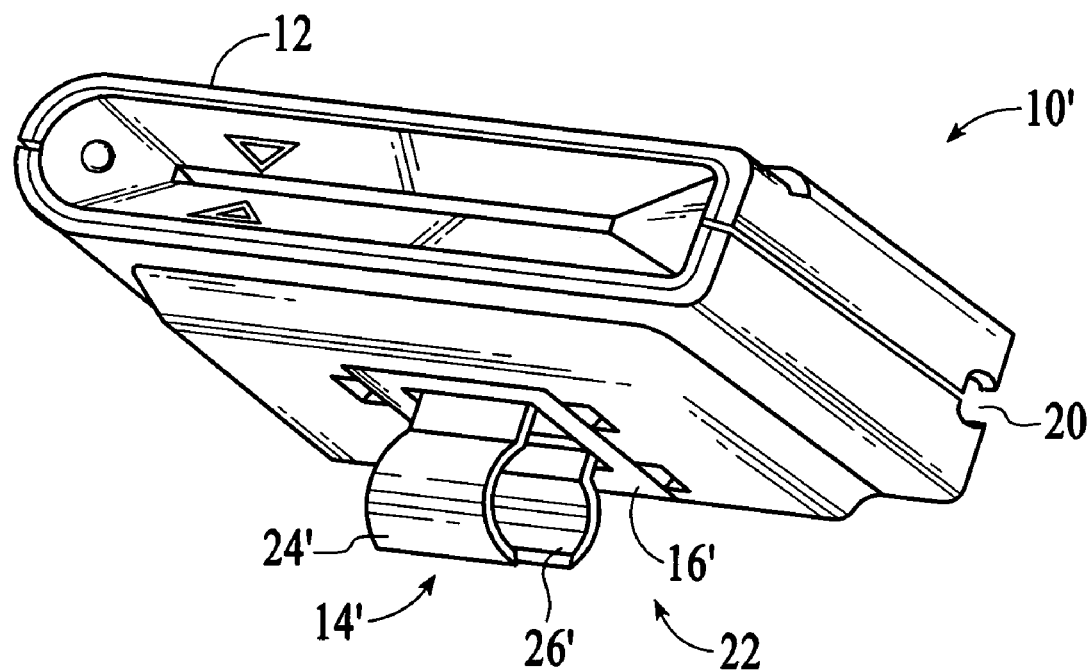
FIG. 3 is a perspective view of a PC accessory device according to a second preferred embodiment of the present invention.
Figure 4:
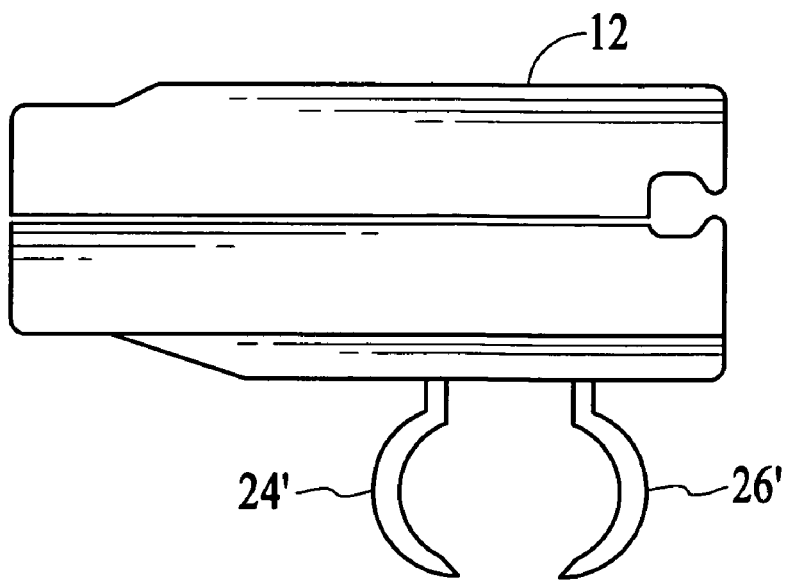
FIG. 4 is a side view of the PC accessory device of according to the second preferred embodiment of the present invention.

FIG. 3 is a perspective view of a PC accessory device according to a second preferred embodiment of the present invention, where similar components are identified by similar item numerals. As is shown, the attachment unit 14' is a clip assembly 16' that includes two curved arms 24', 26' that are bent toward one another. FIG. 4 is a side view of the PC accessory device 10' that better illustrates the orientation of the curved arms 24', 26'. In this preferred embodiment, the curved arms 24', 26' are designed to clamp onto an accessory bar which is then coupled to the keyboard.

Figure 5:
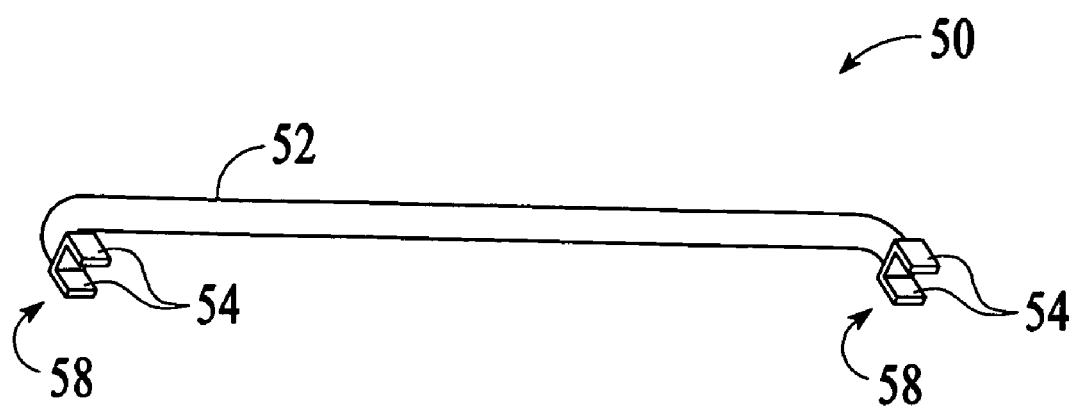
FIG. 5 is a view of an accessory bar according to a second preferred embodiment of the present invention.

FIG. 5 is a view of an accessory bar according to a preferred embodiment of the present invention. As is shown, the accessory bar 50 comprises a tubular segment 52 for receiving one or more accessory devices. Referring to FIG. 3 and FIG. 5, the clip assembly 16' is coupled to the tubular segment 52 by inserting the tubular segment 52 between the curved arms 24', 26' of the clip assembly 16'. When engaged, the curved arms 24', 26' wrap around the tubular segment 52. The diameter of the tubular segment 52 is preferably large enough such that when the clip assembly 16' is coupled to the segment 52, the curved arms 24', 26' are firmly and securely clamped onto the bar 50.

Because the curved arms 24', 26' clamp onto the tubular segment 52, the associated accessory device can be located anywhere along the tubular segment 52. Depending on the length of the tubular segment 52 and the size of the accessory device, generally more than one accessory device can be secured to the accessory bar 50 at one time, which further reduces desk clutter.

Referring again to FIG. 5, the accessory bar 50 includes at least one bar attachment clip 58 that can be located anywhere along the tubular segment 52. Moreover, the location of the bar attachment clip 58 can be static, as is shown in FIG. 5 where one bar attachment clip 58 is located at both ends of the accessory bar 50. In another embodiment, illustrated in FIG. 6, the location of a bar attachment clip 58' can be adjustable such that the position can be relocated along the length of the tubular segment 52.'

Figure 6:
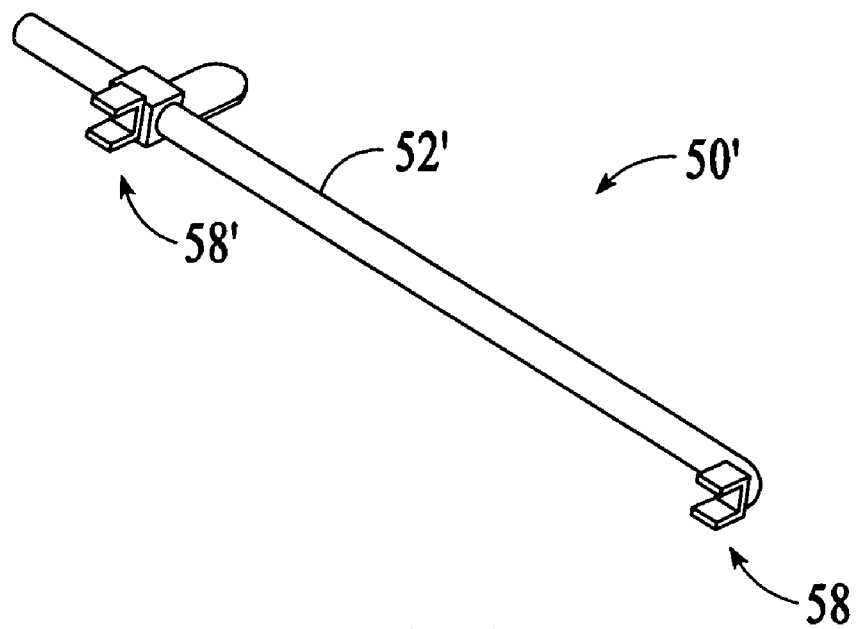
FIG. 6 is a view of an accessory bar according to a second preferred embodiment of the present invention.

As is shown in both FIG. 5 and FIG. 6, the bar attachment clip 58 includes two pronged arms 54, which are similar to the pronged legs 24, 26 of the clip assembly 16 described in FIG. 1. The arms 54 are used to securely couple the accessory bar 50 to the PC keyboard via slots formed in the keyboard.

Figure 7:
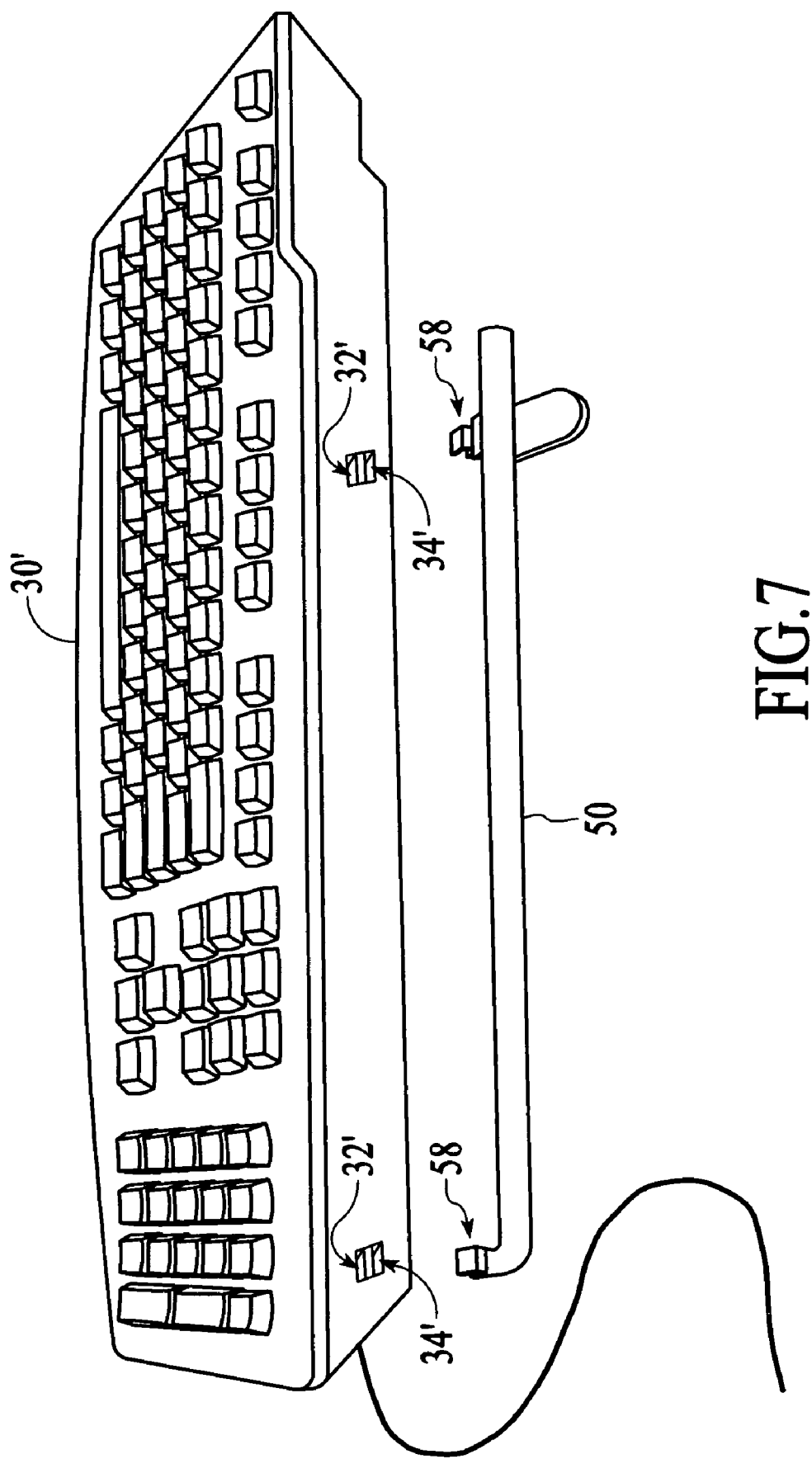
FIG. 7 illustrates the PC keyboard adapted to receive the accessory bar according to a preferred embodiment of the present invention.

FIG. 7 illustrates the PC keyboard 30' adapted to receive the accessory bar 50 according to a preferred embodiment of the present invention. As is shown, the keyboard 30' includes a plurality of slots 32', 34' that are formed to receive the arms 54 of the bar attachment clip 58. The bar attachment clip 58 is preferably formed from a pliable but stiff material, e.g., plastic or metal, such that when the arms 54 are inserted into the corresponding slots 32', 34', the arms 54 snap the bar attachment clip 58 securely into place. When the user wishes to remove the accessory bar 50, the user compresses the arms 54 to release the bar attachment clip 58 from the slots 32', 34'. Although the slots 32', 34' are located on the back surface of the keyboard 30', additional slots (not shown) can be located on side surfaces.

Figure 8:
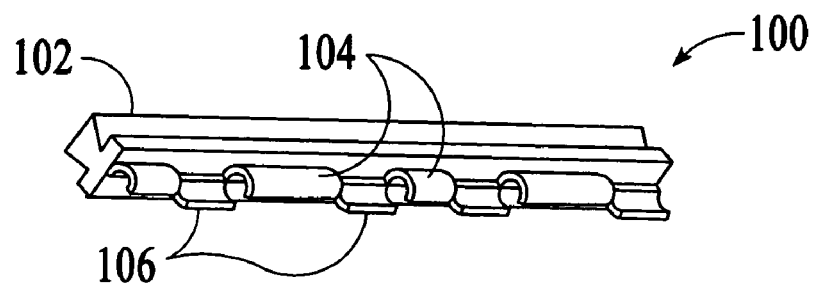
FIG. 8 is a view of the front of an attachment unit according to a third preferred embodiment of the present invention.
Figure 9:
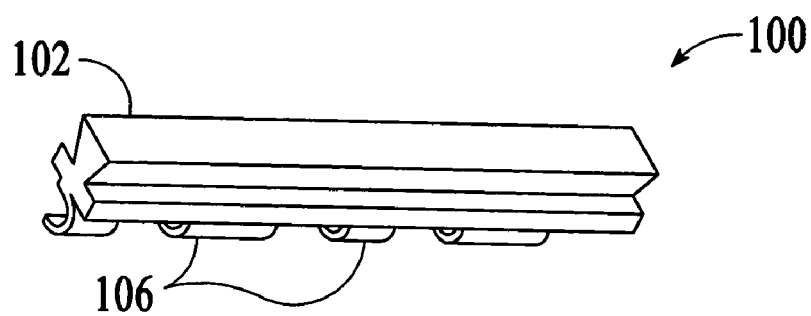
FIG. 9 is a view of the back of an attachment unit according to a third preferred embodiment of the present invention.
Figure 10:
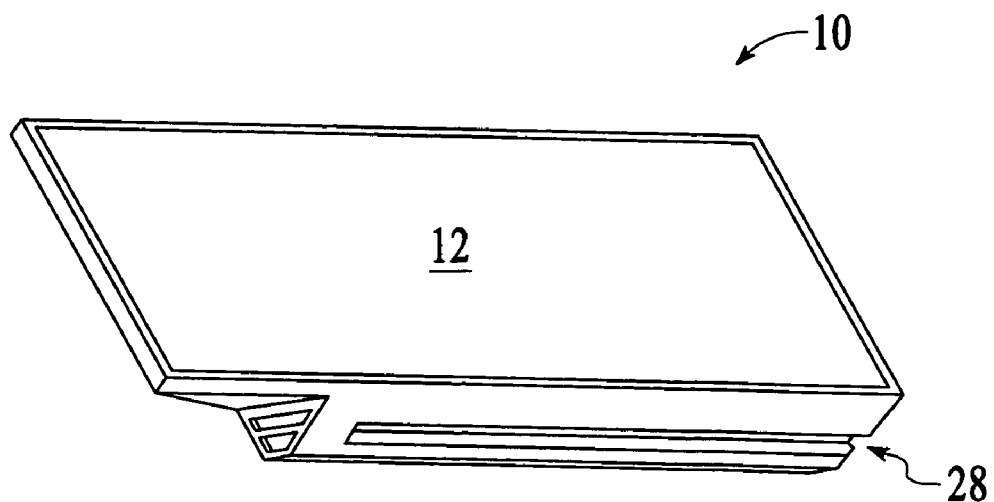
FIG. 10 is a view of the accessory device adapted to receive the attachment unit according to the third preferred embodiment of the present invention.

FIG. 8 and FIG. 9 are front and back views, respectively, of an attachment unit according to a third preferred embodiment of the present invention, and FIG. 10 is a view of an accessory device adapted to receive the attachment unit according to the third preferred embodiment. The attachment unit 100 includes a key 102 that extends the length of the unit 100. The key 102 is used to couple the attachment unit 100 to the body structure 12 (FIG. 10) of the accessory device 10. In a preferred embodiment, the body structure 12 includes a channel 28 that is configured to receive the key 102. For example, as is shown in FIG. 8 and FIG. 9, the key 102 is trapezoidal in shape such that when the key 102 is inserted into the channel 28, which is also trapezoidal in shape to match the key 102, the attachment unit 100 is securely attached to the body structure 12.

According to the preferred embodiment of the present invention, the attachment unit 100 also includes a plurality of top 104 and bottom 106 curved arms that are structured to clamp onto the accessory bar 50 (FIG. 5). The top curved arms 104 are staggered relative to the bottom curved arms 106. Staggering the top 104 and bottom 106 curved arms provides several advantages. For example, the manufacturing process is simplified when the arms are staggered because form molding such structures is easier and more consistent. Moreover, utilizing a plurality of staggered curved arms 104, 106 increases the surface contact area between the attachment unit 100 and the accessory bar 50, thereby providing a more secure coupling.

Through the various preferred embodiments of the present invention, an accessory device is adapted to receive an attachment unit which then allows the accessory device to be temporarily coupled to a PC keyboard directly or via an accessory bar. By attaching the accessory devices to the keyboard, the devices are safely and securely stored, and readily available to the user. In addition, desk clutter is reduced.

While the embodiments described above are focused primarily on attaching the accessory devices to the PC keyboard, those skilled in the art would readily appreciate that the same principles can be applied to other suitable components in a typical computing environment. For example, a computer display, a printer, or a fax machine can be adapted, as described above with regard to the keyboard, to receive the attachment unit/accessory bar in accordance with the preferred embodiments of the present invention. Thus, the principles discussed above can be applied to a variety of components related to the user's computer system.

A system for organizing one or more accessory devices for a personal computer has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A system for organizing one or more personal computer accessory devices comprising:
   a first body structure for housing a first personal computer accessory device; and
   an attachment unit detachably attached to the first body structure for mechanically attaching and detaching the first body structure to an outside surface of a personal computer (PC) component,
   wherein the attachment unit includes a key on a surface adjacent to the first body structure and the first body structure includes a channel on a surface adjacent to the attachment unit configured to receive the key, the attachment unit being attached to the first body structure by inserting the key into the channel, and
   wherein the attachment unit can be removed from the first body structure and attached to a second body structure that houses a second personal computer accessory device so that the second body structure can be attached to the PC component.

2. The system of claim 1, wherein the attachment unit includes a clip assembly that comprises two pronged legs that are inserted into corresponding slots formed in the outside surface of the PC component.

3. The system of claim 2, wherein the slots formed in the PC component provide a mechanical connection between the body structure and the component.

4. The system of claim 2, wherein the PC component is a stand alone PC keyboard and the at least one pair of slots is located on a backside surface of the keyboard facing away from a user.

5. The system of claim 1, further comprising an accessory bar that includes a tubular segment onto which is attached one or more body structures.

6. The system of claim 5, wherein the attachment unit includes a clip assembly that comprises two curved arms that clamp onto the tubular segment of the accessory bar.

7. The system of claim 5, wherein the accessory bar further includes a least one bar attachment clip that comprises two pronged arms that are inserted into corresponding slots formed in an outside surface of the PC component.

8. The system of claim 7, wherein a location of the at least one bar attachment clip is adjustable along the tubular segment.

9. The system of claim 5, wherein the attachment unit includes a plurality of top curved arms and a plurality of bottom curved arms that clamp onto the tubular segment of the accessory bar.

10. The system of claim 9, wherein the plurality of top curved arms are staggered relative to the bottom curved arms.

11. A system for organizing one or more personal computer accessory devices comprising:
    a body structure for housing each of the one or more personal computer accessory devices;
    an attachment unit detachably attached to each body structure; and
    an accessory bar detachably attached to an outside surface of a personal computer (PC) component,
    wherein each attachment unit is configured to clamp onto the accessory bar such that each of the one or more accessory devices is detachably attached to the outside surface of the PC component via its attachment unit and the accessory bar.

12. The system of claim 11, wherein the attachment unit includes a clip assembly that comprises two curved arms that clamp onto the accessory bar.

13. The system of claim 11, wherein the attachment unit includes a plurality of top curved arms and a plurality of bottom curved arms that clamp onto the accessory bar.

14. The system of claim 13, wherein the plurality of top curved arms are staggered relative to the bottom curved arms.

15. The system of claim 11, wherein the attachment unit further includes a key on a surface adjacent to the body structure and the body structure includes on a surface adjacent to the attachment unit a channel configured to receive the key, wherein the attachment unit is attached to the body structure by inserting the key into the channel.

16. The system of claim 11, wherein the accessory bar further includes at least one bar attachment clip that comprises two pronged arms that are inserted into corresponding slots formed in an outside surface of the PC component.

17. The system of claim 16, wherein a location of the at least one bar attachment clip is adjustable along the accessory bar.

18. A system for organizing one or more personal computer accessory devices comprising:
    a body structure for housing each of the one or more personal computer accessory devices, wherein the body structure includes a channel on an outside surface;
    an attachment unit detachably attached to each body structure via a key inserted into the channel, wherein the attachment unit includes a clip assembly that comprises two curved arms; and
    an accessory bar detachably attached to an outside surface of a personal computer (PC) component via slots formed on the outside surface,
    wherein the two curves arms of each attachment unit clamp onto the accessory bar such that each of the one or more accessory devices is detachably attached to the outside surface of the PC component via its attachment unit and the accessory bar.

* * * * *